(12) United States Patent
Soleilhac

(10) Patent No.: US 8,384,320 B2
(45) Date of Patent: Feb. 26, 2013

(54) PROTECTION METHOD FOR A REVERSIBLE ELECTRIC MOTOR

(75) Inventor: Michel Soleilhac, Dissay (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 790 days.

(21) Appl. No.: 12/161,961

(22) PCT Filed: Jan. 29, 2007

(86) PCT No.: PCT/EP2007/050819
§ 371 (c)(1),
(2), (4) Date: Jul. 24, 2008

(87) PCT Pub. No.: WO2007/088147
PCT Pub. Date: Aug. 9, 2007

(65) Prior Publication Data
US 2009/0026986 A1    Jan. 29, 2009

(30) Foreign Application Priority Data
Jan. 31, 2006    (FR) ...................... 06 00873

(51) Int. Cl.
H02P 1/00    (2006.01)
H02P 3/00    (2006.01)
H02P 3/20    (2006.01)
H02P 5/00    (2006.01)

(52) U.S. Cl. .......................... 318/286; 318/283; 318/285

(58) Field of Classification Search .................. 318/286, 318/283, 285
See application file for complete search history.

(56) References Cited

U.S. PATENT DOCUMENTS

| | | | | |
|---|---|---|---|---|
| 4,663,575 A * | 5/1987 | Juzswik et al. | ............... | 318/444 |
| 5,506,483 A * | 4/1996 | McCann et al. | ............... | 318/444 |
| 6,249,098 B1 * | 6/2001 | Miyazaki et al. | ............. | 318/280 |
| 6,281,649 B1 * | 8/2001 | Ouellette et al. | ............. | 318/443 |
| 2001/0028234 A1 * | 10/2001 | Banhidy | ...................... | 318/483 |

FOREIGN PATENT DOCUMENTS

| | | |
|---|---|---|
| DE | 198 45 674 A1 | 4/2000 |
| FR | 2 736 023 A1 | 1/1997 |
| JP | 09 086346 A | 3/1997 |

OTHER PUBLICATIONS

International Search Report w/translation from PCT/EP2007/050819 dated Apr. 20, 2007 (4 pages).

* cited by examiner

Primary Examiner — Walter Benson
Assistant Examiner — Erick Glass
(74) Attorney, Agent, or Firm — Osha Liang LLP

(57) ABSTRACT

A method of protecting a reversible electric motor that includes an armature capable of rotating axially about itself between two angular end positions, the axial rotation of the armature undergoing a deceleration phase as each angular end position approaches, where the method involves determining a characteristic value of the deceleration phase, comparing this characteristic value to a predetermined threshold value, and applying a degraded operating mode when the characteristic value is far from the threshold value.

10 Claims, 3 Drawing Sheets

PROTECTION METHOD FOR A REVERSIBLE ELECTRIC MOTOR

Figure 1:
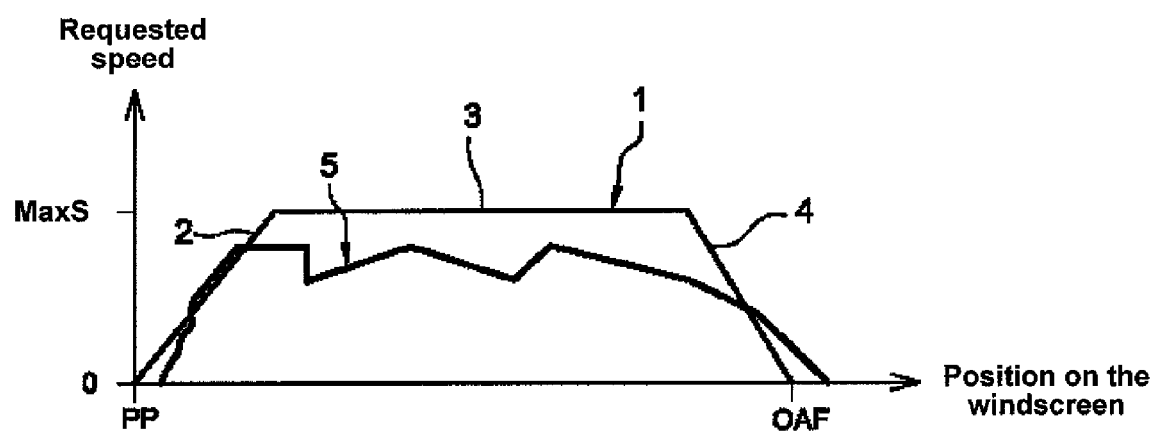

The invention relates to a method intended for protecting the integrity of a reversible electric motor in the event of overheating.

The invention has a particularly advantageous, though not exclusive, application in the field of wiping devices for motor vehicles.

It is known that the operation of a reversible electric motor generates heat. It is also known that excessive heating naturally tends to produce a degradation of the performance of this type of motor, even causing malfunctions that can ultimately lead to irreversible breakdowns.

And yet, in the industry, for obvious reasons of profitability, reversible electric motors are generally dimensioned with just enough power for the intended application. This means that it is particularly important to ensure that the motor is never subjected to excess strain in order to stop it from heating to a critical temperature beyond which its integrity would no longer be guaranteed.

A currently very widespread solution for controlling the operating temperature of a reversible electric motor consists of permanently detecting the consequences of a possible heating and, when applicable, applying a degraded operating mode requiring less electric power to said motor.

In the specific field of windscreen-wiper systems, the parameter to be supervised is normally the sweeping time of the blade arm or arms associated with the reversible electric motor. It is known in fact that this type of duration tends to increase when the temperature of the motor exceeds a given threshold value, which depends on the intrinsic electromechanical structure of said motor. By measuring changes in sweeping time, it is therefore possible directly to detect excessive heating of the reversible electric motor.

This type of detection technique has the disadvantage however of not being accurate enough to allow the detection of all overheating phenomena, in particular the most selective ones. Indeed, a constant sweeping time does not necessarily mean that the corresponding movement takes place at a constant rate. This means that selective speed fluctuations may very well occur throughout this relatively long time period, with heat peaks capable of compromising the integrity of the reversible electric motor.

In addition, the technical problem to be solved by the aim of the present invention is to provide a method for protecting a reversible electric motor including an armature capable of rotating axially about itself between two angular end positions, the axial rotation of the armature undergoing a deceleration phase as each angular end position approaches, protection method which can overcome the problems of the state of the art in particular by providing substantially improved efficiency and simplicity of implementation.

The solution to the technical problem posed consists, according to the present invention, of:
- determining a characteristic value of the deceleration phase,
- comparing this characteristic value to a predetermined threshold value,
- applying a degraded operating mode when the characteristic value is far from the threshold value.

At this point, it can be specified that the characteristic value measured can be, indistinctly, the average speed of rotation of the armature at the end of the deceleration phase, or the momentary speed of rotation of the armature at the end of the deceleration phase.

Regardless, the protection method of the invention is understood to be perfectly capable of simultaneously managing several reversible electric motors, regardless of whether or not the latter are electrically coupled.

The invention as thus defined has the advantage of relating to a limited, but very distinctive, part of the alternating rotation cycle of the armature, namely the deceleration phase. In fact, any variation in a characteristic value of this phase is, without a doubt, symptomatic of an excessive increase in the motor operating temperature.

Another significant advantage of the protection method of the invention is that it is particularly easy to implement in software in the control program of a reversible electric motor, while remaining relatively easy to implement in purely electronic systems.

The present invention also relates to the characteristics that will appear during the following description, and which should be considered on their own or according to any possible technical combination.

Figure 2:
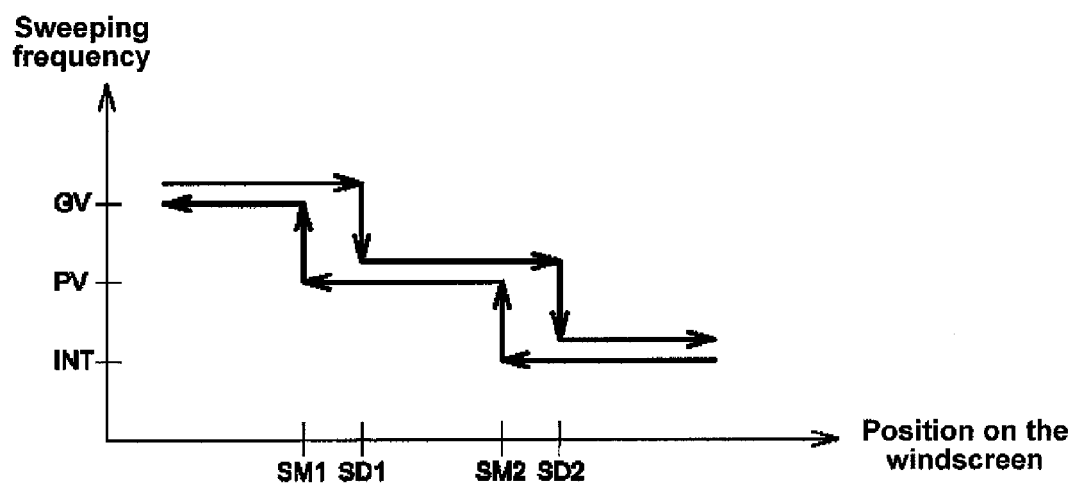
Figure 3:
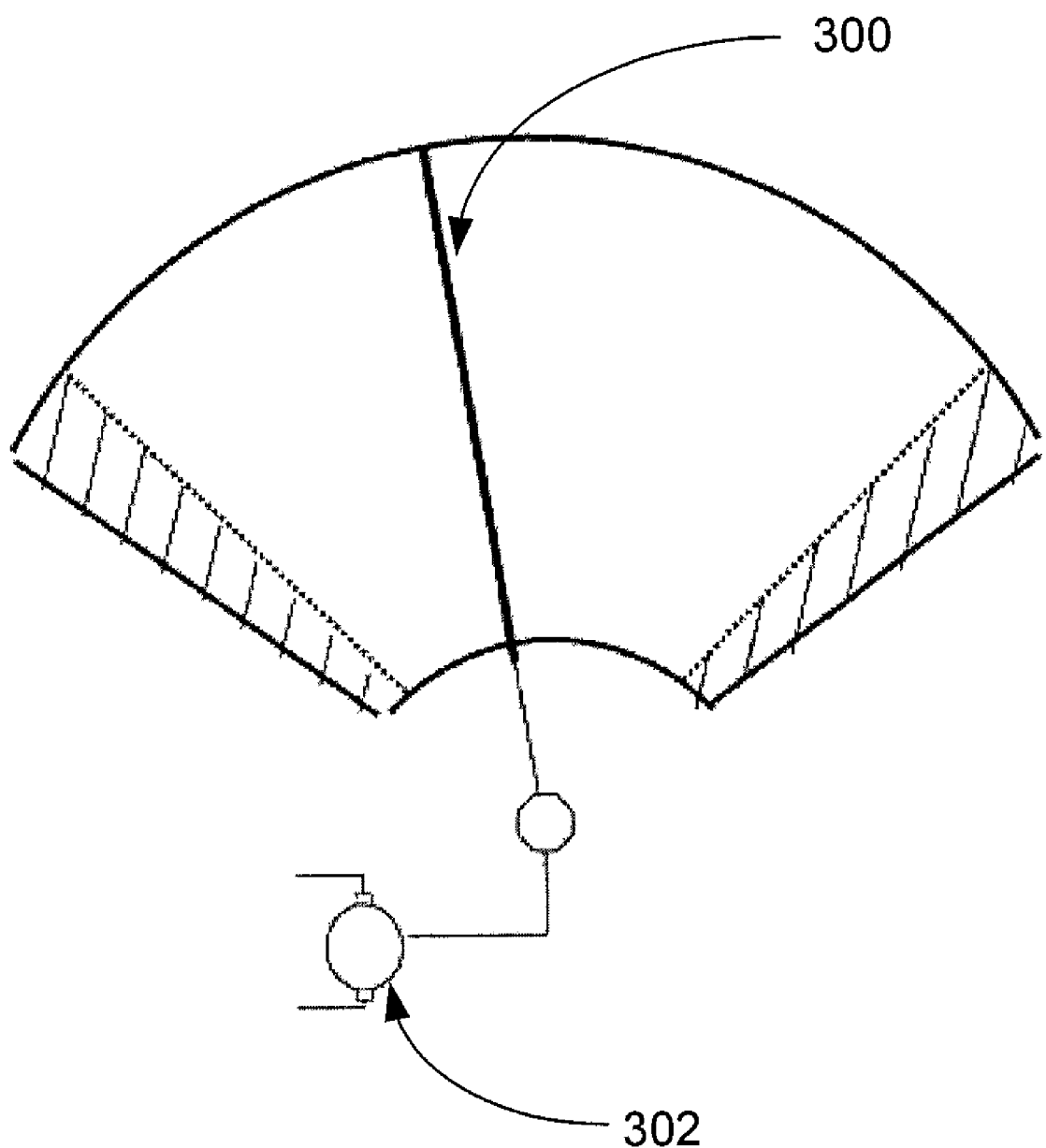
Figure 4:
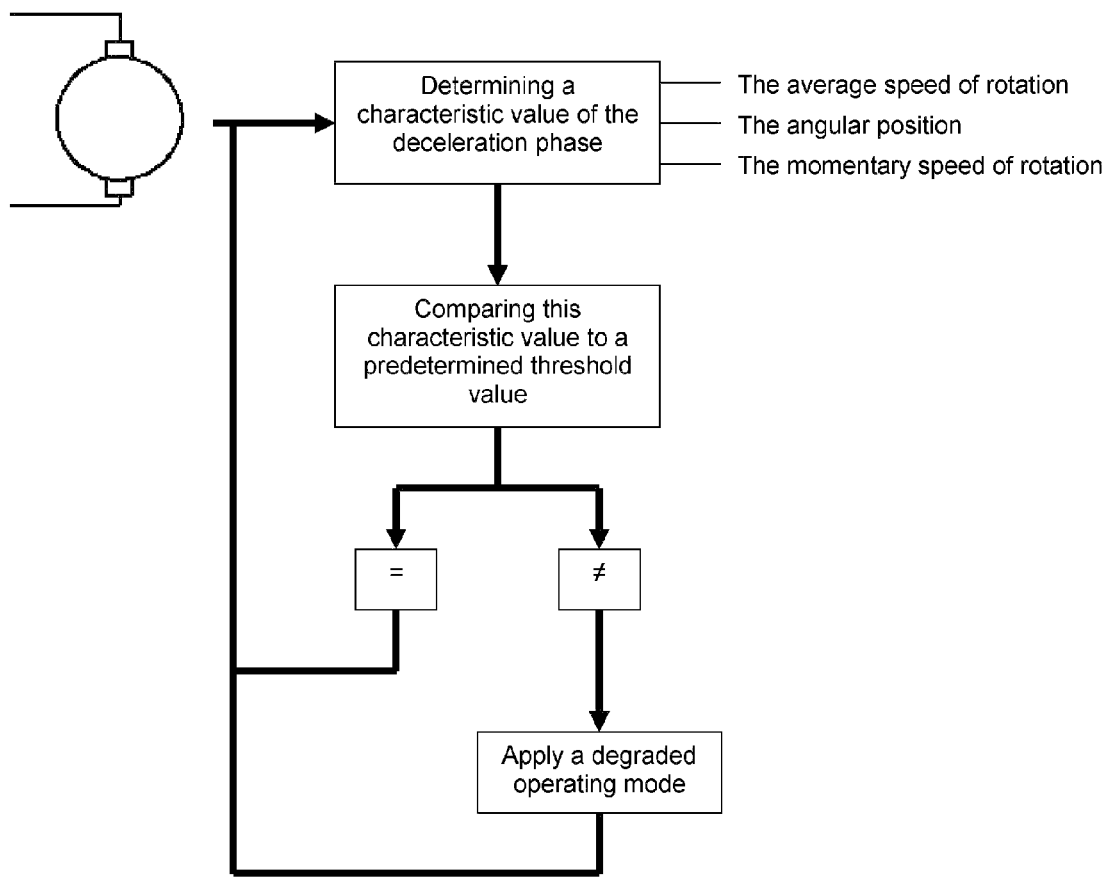

This description, provided as a non-limiting example, intends to ensure better understanding of the invention and how it can be manufactured. It is furthermore made in reference to the appended drawings, in which:

FIG. 1 is a diagram showing a law for controlling a reversible electric motor according to the invention, FIG. 2 is a diagram schematically showing various strategies applicable to the degraded operating mode, FIG. 3 is a diagram schematically showing a wiper pattern for a wiper blade coupled to an armature of a reversible electric motor according to the invention, and FIG. 4 is a diagram schematically showing a flow chart of a method of protecting a reversible electric motor according to the invention.

The example of an embodiment chosen to illustrate the invention relates to a wiping device designed for being installed on a motor vehicle windscreen. This wiping device is usually equipped with a reversible electric motor which drives the movement, according to an alternating rotating sweeping movement, of a drive arm to the end of which is coupled a wiper blade.

A reversible electric motor is generally controlled by a control law which defines the speed of rotation of the armature according to the angular position of the latter. In the case of the presented embodiment, this involves defining the sweeping speed of the wiping device according to the position of the blade arm on the windscreen, as shown precisely in the diagram of FIG. 1. For this purpose, it can be specified that in the practice, the position of the blade arm in relation to the windscreen is usually determined using electronic means such as position sensors.

As can be seen in this diagrammatic representation, the control law 1 comprises an acceleration phase 2, a full-speed phase 3 and a deceleration phase 4, it being understood that movement is considered between a "parking" position marked by the reference PP, and an "opposite fixed stop" position designated by the acronym OAF. Reference 5 corresponds to the route of the actual speed of rotation of the armature in accordance with its angular position or, in a similar manner, to the route of the actual sweeping speed of the blade arm according to its angular position along the windscreen. FIG. 3 provides an example of a wiper pattern for a wiper blade of a windshield wiper 300 coupled to an armature of a reversible electric motor 302 in accordance with the present disclosure.

Concretely, the reversible electric motor is equipped with an armature capable of rotating axially about itself between two angular end positions, which in the present case correspond to the parking position PP and the opposite fixed stop position OAF. The assembly is arranged so that the axial rotation of the armature undergoes a deceleration phase 4 when each angular end position approaches. The speed of rotation of the armature is permanently regulated in order to attain a value as close as possible to that requested, since the friction of the wiper blade against the windscreen naturally tends to affect said speed according to the actual operating conditions of the wiping device.

In accordance with the aim of the present invention, it is provided to implement a protection method capable of preserving the integrity of the reversible electric motor. This is obviously assuming that the reversible electric motor has specific means for implementing the protection method in question.

Regardless, the protection method consists of:
determining a characteristic value of the deceleration phase,
comparing this characteristic value to a predetermined threshold value,
applying a degraded operating mode when the characteristic value is far from the threshold value.

Several solutions are possible.

Thus, according to a first embodiment of the invention, the protection method can initially consist of:
determining the average speed of rotation of the armature during the deceleration phase,
comparing this average speed of rotation to a predetermined threshold value,
applying a degraded operating mode when the average speed of rotation is lower than the threshold value.

This means, in other words, that the characteristic value of the deceleration phase, which is measured in order indirectly to detect a possible heating of the motor, consists in this first embodiment of the invention of the average speed of rotation of the armature during said deceleration phase. But this also means that the degraded operating mode will be applied if an insufficient average speed of rotation is detected. FIG. 4 provides an example of a flow chart for a method of protecting a reversible electric motor in accordance with the present disclosure.

According to a second embodiment of the invention, the protection method can also consist of:
determining the angular position of the armature at the end of the deceleration phase,
comparing this angular position to a predetermined threshold value,
applying a degraded operating mode when the angular offset is greater than the threshold value.

This means, in other words, that the characteristic value of the deceleration phase, which is measured in order indirectly to detect a possible heating of the motor, consists in this second embodiment of the invention of the angular position of the armature when an end position is reached. But this also means that the degraded operating mode will be applied if an excessive angular offset is detected.

According to a third embodiment of the invention, the protection method can finally consist of:
determining the momentary speed of rotation of the armature at the end of the deceleration phase,
comparing this momentary speed of rotation to a predetermined threshold value,
applying a degraded operating mode when the momentary speed of rotation is higher than the threshold value.

This means, in other words, that the characteristic value of the deceleration phase, which is measured in order indirectly to detect a possible heating of the motor, consists in this third embodiment of the invention of the momentary speed of rotation of the armature at the end of the deceleration speed. But this also means that the degraded operating mode will be applied if an excessive momentary speed of rotation is detected.

It should be noted that it is perfectly possible to combine the three previously described embodiments indistinctly to detect a possible heating of the reversible electric motor.

Having said that, once the variation of at least one characteristic value of the deceleration phase has been detected, it is advisable to prevent the corresponding heating from compromising the integrity of the motor. For this purpose, a degraded operating mode is applied, advantageously requiring substantially less electric power. In this case also, several solutions are possible.

According to a first alternative embodiment, the degraded operating mode can initially consist of reducing the axial speed of rotation of the armature.

In the case of a wiping device as in the example illustrating the invention, this consists advantageously of changing from a high sweeping speed GV to a low sweeping speed PV (FIG. 2).

According to a second alternative embodiment, the degraded operating mode can also consist of generating a time delay in at least one of the end positions.

Concretely, this requires cutting off the power to the armature for a given time when the latter is in an angular end position, and then restarting it at the end of the time delay. It should be noted that in the case of the wiping device of the invention, the time delay can be applied indistinctly to the high GV or low sweeping speed PV (FIG. 2).

According to a third alternative embodiment, the armature being activated in normal time by an intermittent rotating movement, the degraded operating mode can consist of extending the intermittence time.

With the wiping device of the example of an embodiment, this advantageously means switching from short intermittence to long intermittence.

FIG. 2 furthermore shows the conventional but essential role played by the rising thresholds SM1, SM2 and the falling thresholds SD1, SD2 in managing the sweeping frequency of the arm when applying various degraded operating modes; said thresholds SM1, SM2, SD1, SD2 obviously being adapted to the characteristic value actually chosen.

Taking the example of FIG. 2, let us assume that the sweeping frequency of the blade arm is set to high speed CV. If the average speed of rotation of the arm during the deceleration speed drops to the point where it reaches the falling threshold SD1, then the protection method orders the switch to low speed PV. If the average speed of the arm continues to drop until the falling threshold SD2, then it will switch to intermittent speed INT.

On the other hand, if the average speed of the arm begins to recover and reaches the rising threshold SM2, the protection method orders the switch from intermittent speed INT to low speed PV. If the rise continues until the rising threshold SM1, then it will switch to high speed GV.

In a particularly advantageous manner, the protection method can advantageously be implemented by software means.

Evidently, the invention also relates to any reversible electric motor equipped with an armature capable of rotating axially about itself between two angular end positions, also comprising means for implementing the protection method such as previously described.

In even more general terms, the invention also relates to any wiping device, in particular for a motor vehicle, equipped with at least one reversible electric motor according to the preceding claim.

The invention claimed is:

1. A method of protecting a reversible electric motor comprising an armature capable of rotating axially about itself between two angular end positions, the axial rotation of the armature undergoing a deceleration phase as each angular end position approaches, wherein the method comprises:

determining a characteristic value of the deceleration phase;

comparing the characteristic value to a predetermined threshold value; and applying a degraded operating mode as a result of the comparison, when the characteristic value is different from the threshold value of the deceleration phase, wherein the characteristic value being different from the threshold value indicates an increase in a heating temperature of the reversible electric motor, and wherein application of the degraded operating mode results in supplying substantially less electric power to the reversible electric motor.

2. The protection method according to claim 1, further comprising:

determining an average speed of rotation of the armature during the deceleration phase, comparing this average speed of rotation to the predetermined threshold value, applying the degraded operating mode when the average speed of rotation is lower than the threshold value.

3. The protection method according to claim 1, further comprising:

determining an angular position of the armature at the end of the deceleration phase, comparing the angular position to the predetermined threshold value, applying the degraded operating mode when an angular offset is greater than the threshold value.

4. The protection method according to claim 1, further comprising:

determining the momentary speed of rotation of the armature at the end of the deceleration phase, comparing the momentary speed of rotation to a predetermined threshold value, applying the degraded operating mode when the momentary speed of rotation is higher than the threshold value.

5. The protection method according to claim 1, wherein applying the degraded operating mode comprises reducing the axial speed of rotation of the armature.

6. The protection method according to claim 1, wherein applying the degraded operating mode comprises generating a time delay in at least one of the angular end positions.

7. The protection method according to claim 1, wherein the armature is activated by an intermittent movement of rotation, and wherein the degraded operating mode consists of extending an intermittence time.

8. The protection method according to claim 1, wherein the method is implemented using software means.

9. A reversible electric motor equipped with an armature capable of rotating axially about itself between two angular end positions, wherein the reversible electric motor is configured to:

determine a characteristic value of the deceleration phase, compare the characteristic value to a predetermined threshold value, and apply a degraded operating mode when the characteristic value is different from the threshold value of the deceleration phase, wherein the characteristic value being different from the threshold value indicates an increase in a heating temperature of the reversible electric motor, wherein application of the degraded operating mode results in supplying substantially less electric power to the reversible electric motor.

10. The reversible electric motor of claim 9, wherein the reversible electric motor is part of a wiping device for a motor vehicle.

* * * * *